United States Patent [19]
Cuffe et al.

[11] 3,817,554
[45] June 18, 1974

[54] STEP-UP DEVICE

[76] Inventors: Moses L. Cuffe, 715 Arastradero Rd., Palo Alto, Calif. 94306; Ralph L. Frese, 3109 Ross Rd., Palo Alto, Calif. 94303

[22] Filed: May 24, 1972

[21] Appl. No.: 256,414

[52] U.S. Cl. .................................. 280/166, 182/88
[51] Int. Cl. .............................................. B60r 3/02
[58] Field of Search ............ 280/166, 164 R, 164 A, 280/163; 182/88

[56] References Cited
UNITED STATES PATENTS

| | | | |
|---|---|---|---|
| 2,533,050 | 12/1950 | Runyen | 280/166 |
| 2,956,638 | 10/1960 | Bustin | 280/166 |
| 3,515,406 | 6/1970 | Endsley | 280/166 |
| 3,517,942 | 6/1970 | Cuffe | 280/166 |

FOREIGN PATENTS OR APPLICATIONS

| 105,817 | 11/1938 | Austria | 280/166 |
|---|---|---|---|

*Primary Examiner*—Robert R. Song
*Attorney, Agent, or Firm*—Alfons Puishes

[57] ABSTRACT

A highly improved disappearing and retractable step for use with motor vehicle bodies such as mobile homes, trailers, campers, and the like combines a novel combination of slide, guide and operating means whereby a step which is normally safely positioned underneath the body while the vehicle is in transit may be rapidly withdrawn and positioned for safe access using a combined rotating and translation motion but eliminating the need for many mechanisms such as cams, slots, and guides which have characterized previous devices. At the same time the device permits for rapid return through spring action to its safe position under the vehicle.

1 Claim, 2 Drawing Figures

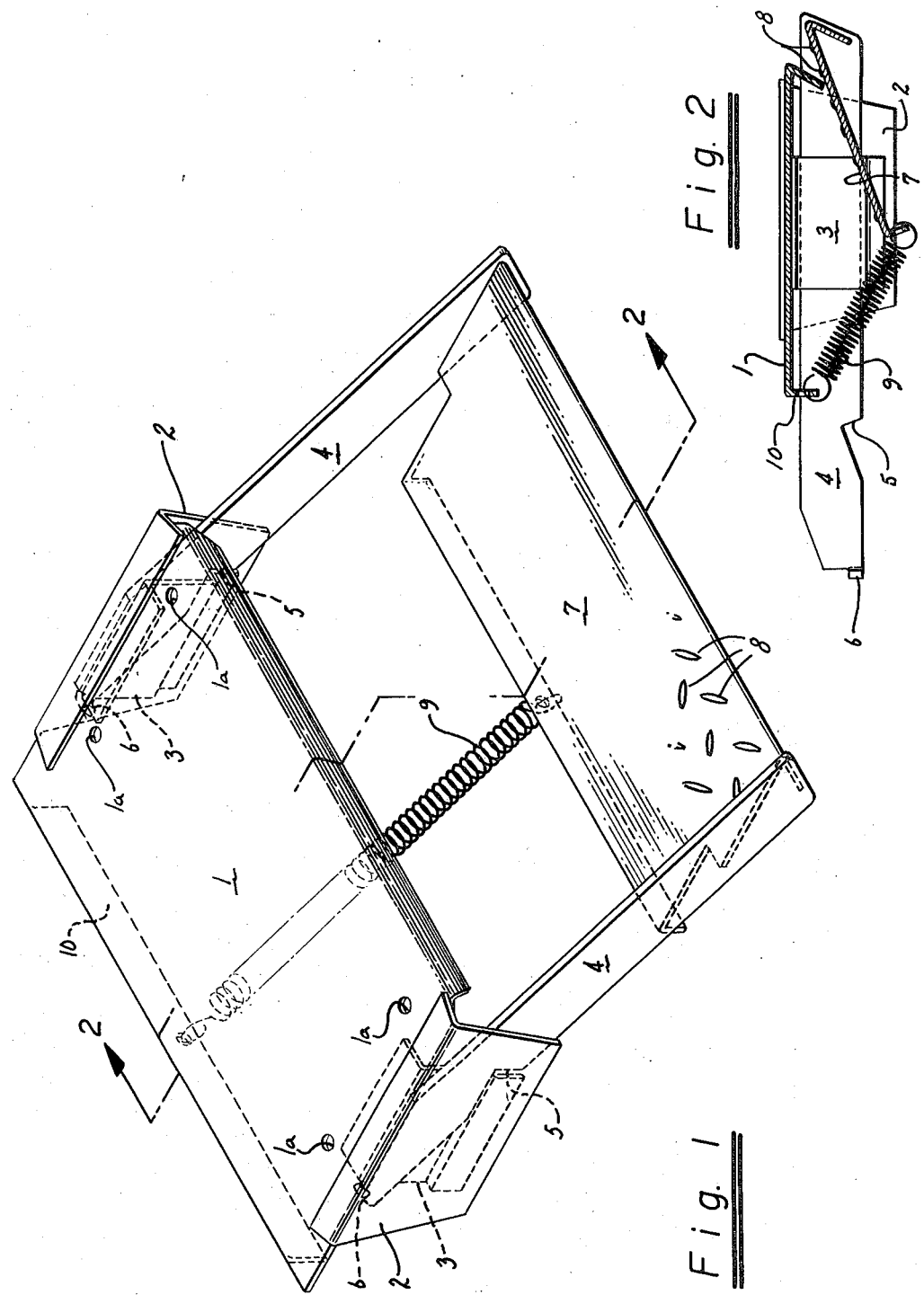

STEP-UP DEVICE

BACKGROUND OF THE INVENTION

The utilization of vehicles such as trailers, campers, station wagons and mobile homes, as well as trucks of various types has grown by leaps and bounds within very recent years increasing the problem of safe access to the interior of such vehicles by the persons utilizing them. The problem of providing a step which would be safely positioned under the body of such a vehicle while it is in transit on the highway and yet permit it to be withdrawn and operated in a manner which would insure safe access by minimizing the possibility of slipping, etc., has been partially solved by our invention known as "Hide'Away Step-Up Device" covered by U.S. Pat. No. 3,517,942.

Under certain conditions where a wider step is desired and where it is inconvenient to use the mechanism of our previous invention we have invented a step which performs the needed functions and solves the problem presented as set forth more fully below.

SUMMARY OF THE INVENTION

We have discovered that especially when certain structural conditions permit or allow it we are able to eliminate the guide slots with rollers and the cam and cam roller follower as these elements are described in our previous invention and substitute a combination of guides, plates, notches, and grooves incorporated within our structure which perform the necessary functions and solve the long standing problem in a much simpler manner. More specifically, our latest invention permits easier and cheaper construction of a device to perform the needed function and solve the long existing problem as will be evident from the description which follows.

DESCRIPTION OF THE DRAWING

FIG. 1 is an isometric view of the retractable step of our invention showing the simplified components and elements making possible its novel operation.

FIG. 2 is a sectional view along the lines 2 — 2 of FIG. 1.

DESCRIPTION OF A PREFERRED EMBODIMENT

Referring now to the drawing, there is seen first a base plate 1 disposed for fastening to the underside of a vehicle body such as that referred to herein by means of holes 1a.

Side plates 2 form an integral part of base plate 1 and are in general at right angles thereto and project downward.

Slide guides 3 are located on the side of plates 2 and serve to perform a novel combined function of sliding and guiding which partly replaces the cam action of previous devices.

Slide plates 4, which are disposed for traveling within slide guides 3, are of generally elongated construction and serve also as support members for the rest of the device.

Positioned upon slide plates 4 are guide grooves or notches 5. These are located preferably on the lower edge of slide plates 4 and because of their special configuration and their cooperating relation with slide guides 3, they permit slide plates 4 to effect a combined motion of rotation and translation as the side plates 4 are retracted from underneath the vehicle.

Slide plate stops 6 limit the travel of the slide plates.

The step 7 is fixedly positioned upon and between slide plates 4 and provides the access for the foot of personnel boarding the vehicle. The treads 8 upon the surface of step 7 serve to increase the traction or friction between the foot of the person boarding and the surface of the step itself.

A spring 9 which may be of a helical configuration is interposed between the step member 7 and a backing section 10, which latter forms an integral part of base plate 1, and serves to help hold step 7 in its withdrawn position for boarding the vehicle and to resume its retracted position after boarding has been accomplished.

Instead of my slide plates 4 in combination with guide notches 5 I may use arcuate or curved slots positioned in side plates 2 with cooperating pins positioned on slide plates 4 and traveling within said slots to give me the combined motion of rotation and translation which I require. These elements of my invention, as well as those previously described are characterized by the equivalent or generic term "grooves" as set forth in the claims.

OPERATION

The operation of our improved device is similar to that described in our previous invention except that the interaction of the elements is quite evidently different.

A person desiring to board a vehicle such as that described, simply places his foot on the edge of step 7 and with the aid of treads 8 is able to depress the step from the horizontal position downwards.

Slide plates 4 then travel downwards and outwards. This combined action is produced by the results of interaction between slide guides 3 and guide notches 5. Of course, if I use an arcuate slot in side plates 2, together with a follower positioned on slide plates 4, we obtain the same result. We thus attain the safety feature of our invention by causing the step to slide horizontally under the foot of the person boarding it, preventing slipping off and injury to the person or the vehicle.

After boarding, of course, the asembly or its movable components are returned to their original position under the vehicle by the action of spring 9.

We claim:

1. An improved retractable access step for location under a vehicle body comprising:
   a base plate disposed for fastening to the body of said vehicle;
   side plates fixedly positioned on opposite sides of said base plate;
   side guides positioned on said side plates;
   slide members disposed for sliding relationship with said side guides;
   a step member positioned fixedly between said slide members at the first end thereof;
   guide grooves positioned on the lower edge of said slide members and forming a part thereof at the second ends thereof;
   said slide members and said guide grooves being disposed to engage said side guides;

said guide grooves being further characterized by a generally V-shaped contour;

spring means engaging said base plate with said step;

said spring means being disposed to bias said step in a retracted position under said vehicle body;

said spring means being further disposed to bias said slide members and said guide grooves against said side guides;

said slide members having stop means provided at said second ends, said side guides being further disposed to effect positive engagement with said stop means when said step is completely withdrawn;

whereby the combined action of said slide members, said side guides, said guide grooves and said spring means imparts a combined positive motion of rotation and translation to said step as it is withdrawn from under said vehicle body and provides positive locking of said step in a horizontal withdrawn position.

* * * * *